United States Patent
Raats et al.

(10) Patent No.: US 10,642,469 B2
(45) Date of Patent: May 5, 2020

(54) METHOD AND SYSTEM FOR USER ADJUSTMENT OF VEHICLE SETTINGS

(71) Applicant: Volvo Car Corporation, Göteborg (SE)

(72) Inventors: Kaspar Raats, Göteborg (SE); Jonas Göthlin, Torslanda (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/281,191

(22) Filed: Feb. 21, 2019

(65) Prior Publication Data

US 2019/0278466 A1  Sep. 12, 2019

(30) Foreign Application Priority Data

Mar. 12, 2018  (EP) .................................... 18161264

(51) Int. Cl.
| | | |
|---|---|---|
| *G06F 3/14* | (2006.01) | |
| *G06F 3/0484* | (2013.01) | |
| *B60W 50/12* | (2012.01) | |
| *G06F 3/0482* | (2013.01) | |
| *B60K 37/06* | (2006.01) | |
| *B60K 35/00* | (2006.01) | |
| *B62D 1/04* | (2006.01) | |

(52) U.S. Cl.
CPC .......... *G06F 3/04847* (2013.01); *B60K 35/00* (2013.01); *B60K 37/06* (2013.01); *B60W 50/12* (2013.01); *G06F 3/0482* (2013.01); *B60K 2370/111* (2019.05); *B60K 2370/122* (2019.05); *B60K 2370/145* (2019.05); *B60K 2370/1438* (2019.05); *B62D 1/046* (2013.01)

(58) Field of Classification Search
CPC ....................................................... G06F 3/14
USPC .............................. 715/771; 701/1; 345/169
See application file for complete search history.

(56) References Cited

U.S. PATENT DOCUMENTS

| | | | |
|---|---|---|---|
| 2004/0090424 A1* | 5/2004 | Hurley ..................... | G09G 5/00 |
| | | | 345/169 |
| 2010/0268426 A1 | 10/2010 | Pathak et al. | |
| 2011/0082616 A1 | 4/2011 | Small et al. | |
| 2012/0283894 A1* | 11/2012 | Naboulsi .................. | A61B 5/18 |
| | | | 701/1 |
| 2017/0060249 A1 | 3/2017 | Scheufler et al. | |

OTHER PUBLICATIONS

Jul. 12, 2018 European Search Report issue on International Application No. EP18161264.

* cited by examiner

*Primary Examiner* — Ruay Ho

(74) *Attorney, Agent, or Firm* — Clements Bernard Walker; Christopher L. Bernard

(57) ABSTRACT

A method performed by a vehicle settings adjustment system for facilitating user adjustment of vehicle settings of a vehicle via a display of the vehicle. The vehicle settings adjustment system determines occurrence of user interaction with a physical control interface of the vehicle, user interaction with the physical control interface affecting a therewith associated predetermined vehicle function. The vehicle settings adjustment system further provides on the display a user selectable shortcut adapted to, upon user selection thereof, provide on the display a subset of user selectable setting options enabling adjustment of one or more user adjustable vehicle settings associated with the predetermined vehicle function.

12 Claims, 5 Drawing Sheets

METHOD AND SYSTEM FOR USER ADJUSTMENT OF VEHICLE SETTINGS

CROSS-REFERENCE TO RELATED APPLICATION

The present patent application/patent claims the benefit of priority of co-pending European Patent Application No. 18161264.9, filed on Mar. 12, 2018, and entitled "METHOD AND SYSTEM FOR USER ADJUSTMENT OF VEHICLE SETTINGS," the contents of which are incorporated in full by reference herein.

TECHNICAL FIELD

The present disclosure relates to a vehicle settings adjustment system and a method performed therein for facilitating user adjustment of vehicle settings of a vehicle via a display of said vehicle.

BACKGROUND

In many vehicles today, a user of the vehicle—such as a driver thereof—may change advanced settings of the vehicle to for instance suit his or her preferences or to fulfill legal requirements applicable for the jurisdiction the vehicle currently may be located in. Such advanced vehicle settings may for instance be associated with the vehicle's lights and/or headlights and refer to activation/deactivation of e.g. Active High Beam and/or Active Bending Lights etc., and/or be for instance be associated with the power window(s) and/or door(s) and refer to activation/deactivation of e.g. child lock. Commonly, the user may adjust the advanced vehicle settings by selecting vehicle setting options available via a display of the vehicle. It is furthermore common that the setting options are made available in different menus, for instance categorized based on functionality and/or a certain vehicle function, such as e.g. vehicle lights and/or headlights.

However, although setting options available via the vehicle display provide for the ability of adjusting advanced vehicle settings, it may be inconvenient, time consuming and/or frustrating to go through potentially deep menus to find the setting options of a specific sought after advanced vehicle setting(s).

SUMMARY OF THE INVENTION

It is therefore an object of embodiments herein to provide an approach for facilitating—via a display of a vehicle—user adjustment of certain advanced vehicle settings of said vehicle.

According to a first aspect of embodiments herein, the object is achieved by a method performed by a vehicle settings adjustment system for facilitating user adjustment of vehicle settings of a vehicle via a display of the vehicle. The vehicle settings adjustment system determines occurrence of user interaction with a physical control interface of the vehicle, which user interaction with the physical control interface affects a therewith associated predetermined vehicle function. The vehicle settings adjustment system further provides on the display a user selectable shortcut adapted to, upon user selection thereof, provide on the display a subset of user selectable setting options enabling adjustment of one or more user adjustable vehicle settings associated with the predetermined vehicle function.

Thereby, by introducing a method performed by a vehicle settings adjustment system for facilitating user adjustment of vehicle settings of a vehicle via a display of the vehicle, an approach is provided enabling a user such as a driver or passenger to—via said display—change certain vehicle settings in a simplified manner. Moreover, since occurrence of user interaction with a physical control interface of the vehicle is determined, which user interaction with the physical control interface affects a therewith associated predetermined vehicle function, it is established that a user such as a vehicle driver or passenger has engaged with a physical user interface of the vehicle, such as with e.g. a steering wheel paddle, knob, switch or button, having impact on a specific vehicle function such as e.g. activation/deactivation of headlights. Furthermore, since there is provided on the display a user selectable shortcut adapted to—upon user selection thereof—provide on the display a subset of user selectable setting options enabling adjustment of one or more user adjustable vehicle settings associated with the predetermined vehicle function, a shortcut e.g. represented by an icon is provided on the display which upon selection provides and thus enables direct access to a vehicle settings menu comprising user adjustable setting options specifically associated with the specific vehicle function affected by the previous physical control interface user interaction. Thereby, a shortcut is provided which upon selection presents a subset of vehicle setting options related to said predetermined vehicle function, whereas other user adjustable setting options unrelated to said predetermined vehicle function may be filtered out. Accordingly, for setting options associated with the predetermined vehicle function such as e.g. vehicle lights; rather than having to scroll through and/or go deep into menus to find said setting options such as e.g. activation/deactivation of e.g. Active High Beam and/or Active Bending Lights etc., a direct link to said setting options is provided via the shortcut. In this manner, the shortcut enables direct access to vehicle settings associated with the vehicle function affected by the latest physical control interface user interaction.

For that reason, an approach is provided for via a display of a vehicle facilitate user adjustment of certain advanced vehicle settings of said vehicle.

The technical features and corresponding advantages of the above mentioned method will be discussed in further detail in the following.

By introducing a method performed by a vehicle settings adjustment system for facilitating user adjustment of vehicle settings of a vehicle via a display of the vehicle, an approach is provided enabling a user such as a driver or passenger to—via said display—change certain vehicle settings in a simplified manner. "Facilitating" user adjustment of vehicle settings may refer to "simplifying" user adjustment of vehicle settings, whereas "facilitating user adjustment of vehicle settings" may refer to "providing easy and/or direct access to adjustment of predetermined and/or specific vehicle settings". Moreover, "vehicle settings" may refer to "advanced vehicle settings", "vehicle parameter settings", "vehicle settings allowed to be adjusted by a user" and/or "vehicle functionality settings", whereas "vehicle" may refer to any arbitrary vehicle, for instance an engine-propelled and/or electrically-powered vehicle such as a car, truck, lorry, van, bus, tractor, motor cycle, scooter, military vehicle, aircraft, aeroplane, drone, vessel, boat etc., or a rail-bound vehicle such as e.g. a train or tram. "Display" may refer to a known "touch display", "head up display", "eye tracking adapted display", and/or "gesture sensing adapted display", and said display—which may be of arbitrary shape and size—may be arbitrarily positioned within the vehicle, e.g. comprised in, attached to and/or projected onto a dashboard, console, cluster, windscreen, seat and/or ceiling thereof. "Vehicle settings adjustment system", on the other hand, may refer to "vehicle settings adjustment system comprised in a vehicle".

Since the vehicle settings adjustment system determines occurrence of user interaction with a physical control interface of the vehicle, which user interaction with the physical control interface affects a therewith associated predetermined vehicle function, it is established that a user such as a vehicle driver or passenger has engaged with a physical user interface of the vehicle, such as with e.g. a steering wheel paddle, knob, switch or button, having impact on a specific vehicle function such as e.g. activation/deactivation of headlights. The "vehicle function" may refer to any arbitrary function of the vehicle, which may be controlled by a user such as a driver or passenger via a physical control interface of said vehicle. "Vehicle function" may accordingly for instance refer to, be represented by, be associated with and/or comprise vehicle light(s), e.g. exterior lights, headlights and/or fog lights, vehicle power window(s), vehicle power door(s), vehicle power seat(s), vehicle shifter, vehicle drive modes, vehicle start switch, vehicle window wipers, vehicle interior light(s), vehicle sunroof, vehicle tailgate, and/or vehicle steering wheel etc. The "physical control interface", on the other hand, may refer to any arbitrary physical control interface of said vehicle, via which one or more vehicle functions may be controlled. "Physical control interface" may accordingly be represented by and/or comprise a paddle, a knob, a button, a switch, a bezel, a wheel, a touch sensing surface, a touch sensing area, a touch surface and/or a secret-until-lit touch-sensitive area, for instance provided on and/or near a steering wheel, a front seat door and/or backseat door, a gear stick and/or shifter, a front seat and/or a backseat, an instrument panel, a console, a cluster and/or a tailgate of the vehicle, with which a user such as a driver or passenger may engage to influence and/or affect one or more vehicle functions. User interaction with a first physical control interface may affect a first vehicle function, whereas user interaction with a second physical control interface may affect a second vehicle function. Determining "occurrence of user interaction with" a physical control interface may refer to determining "that a user has engaged with, interacted with, touched, pushed, turned and/or rotated" a physical control interface, whereas "physical control interface" may refer to "first physical control interface", "user interface", "physical interface", "functionality changing physical control interface", "user interaction sensing physical interface", and/or "physical control interface excluding display and/or touch display". Moreover, physical control interface "of" the vehicle, may refer to physical control interface "comprised in and/or which is part of" the vehicle. "Determining" occurrence of user interaction may refer to "detecting" and/or "sensing" occurrence of user interaction, and may indicate that it has been established that a specific vehicle function has been affected e.g. activated, deactivated, modified etc. following user interaction with a physical control interface associated therewith. Determining occurrence of user interaction may be established as known in the art, e.g. by commonly known sensors and/or by deriving information regarding that the specific vehicle function has been affected following user interaction with the physical control interface, via e.g. a commonly known communication bus. "Affecting" a therewith associated predetermined vehicle function may refer to "influencing, activating, deactivating, modifying, changing and/or setting" a therewith associated predetermined vehicle function, whereas affecting "a therewith associated predetermined vehicle function" may refer to affecting "a predetermined vehicle function associated with, related to, in connection with and/or in communication with the physical control interface". Furthermore, affecting a therewith associated "predetermined" vehicle function may refer to affecting a therewith associated "certain", "specific", "first" and/or "at least a first" vehicle function.

Since the vehicle settings adjustment system provides on the display a user selectable shortcut adapted to—upon user selection thereof—provide on the display a subset of user selectable setting options enabling adjustment of one or more user adjustable vehicle settings associated with the predetermined vehicle function, a shortcut e.g. represented by an icon is provided on the display which upon selection provides and thus enables direct access to a vehicle settings menu comprising user adjustable setting options specifically associated with the specific vehicle function affected by the previous physical control interface user interaction. Thereby, a shortcut is provided which upon selection presents a subset of vehicle setting options related to said predetermined vehicle function, whereas other user adjustable setting options unrelated to said predetermined vehicle function may be filtered out. Accordingly, for setting options associated with the predetermined vehicle function such as e.g. vehicle lights and/or headlights; rather than having to scroll through and/or go deep into menus to find said setting options such as e.g. activation/deactivation of e.g. Active High Beam and/or Active Bending Lights etc., a direct link to said setting options is provided via the shortcut. In this manner, the shortcut enables direct access to vehicle settings associated with the vehicle function affected by the latest physical control interface user interaction. The subset of user selectable setting options may be represented by a set of setting options categorized to relate to the predetermined vehicle function; additionally or alternatively, user selection of the shortcut may link to a specific section of a general setting options menu comprising setting options related to a variety of vehicle functions, said section then comprising the subset thus providing direct linking thereto. The "user adjustable vehicle settings" may refer to "vehicle settings configured to and/or allowed to be adjusted by a user". Moreover, user adjustable vehicle settings "associated with" the predetermined vehicle function may refer to user adjustable vehicle settings "specifically associated with" and/or "categorized to relate to" the predetermined vehicle function. Vehicle settings "associated with" the predetermined vehicle function may refer to vehicle settings "related to" and/or "adjusting functionality and/or settings of" the predetermined vehicle function. The subset—which may comprise one or more user selectable setting options—may comprise arbitrary vehicle settings options related to the vehicle function, such as e.g. an option of activating/deactivating Active High Beam and/or an option of activating/deactivating Bending Lights should the predetermined vehicle function affected by the previous physical user interface interaction—e.g. represented by the driver activating headlights via a steering wheel paddle—relate to vehicle lights and more specifically headlights. "Providing" on the display may refer to "activating, displaying, visualizing and/or presenting" on the display, whereas user selectable "shortcut" may refer to user selectable "link, icon and/or graphic visualization". Moreover, "user selectable shortcut" may refer to "shortcut configured to be selectable by a user such as a driver or passenger", and further to "user selectable shortcut associated with the predetermined vehicle function". The selectable shortcut may be positioned in any arbitrary section of the display. Moreover, the size, shape, design and/or graphic visualization of the shortcut may in a similar manner be arbitrary, and/or adapted to the conditions at hand. Preferably, the shortcut is graphically designed—for instance as a modified cogwheel—such that a user intuitively may conclude that the shortcut links to settings options. The expression "upon user selection thereof" may refer to "subsequent and/or following user selection thereof" and/or "upon user selection of the user selectable shortcut", whereas "provide" on the display may refer to "display, visualize and/or present" on the display and further to "initiate provision of" on the display. The expression "provide on the display a subset of user selectable setting options" may refer to "provide on the display direct access to a subset of user selectable setting options", "provide on the display—out of a set of user adjustable setting options—a subset of user adjustable setting options associated specifically with said predetermined vehicle function", "give access to a subset of user selectable setting options", "give direct access to a subset of user selectable setting options". The expression subset of user selectable setting options "enabling adjustment" may refer to subset of user selectable setting options "associated with, specifically associated with, relevant for, reflecting, corresponding to, categorized to relate to said predetermined vehicle function, said subset enabling adjustment". Moreover, user selectable "setting options" may refer to user selectable "setting alternatives and/or tunings".

Optionally, the providing of the user selectable shortcut described in the foregoing may comprise providing the user selectable shortcut for a predeterminable or predetermined period of time. Thereby, the shortcut is displayed and thus available temporarily, rather than permanently. Accordingly, following upon a physical control interface interaction affecting a specific vehicle function, the shortcut gives direct access to adjusting user adjustable vehicle settings related to said vehicle function, for a period of time considered relevant; after that the shortcut is disabled, removed and/or inactivated. The predeterminable period of time may be arbitrarily selected, and may further according to an example be set by a user such as the driver or a passenger. Optionally, the predeterminable period of time is preferably less than 3 minutes, more preferred less than 1 minute, and most preferred less than 30 seconds.

Optionally, the providing of the user selectable shortcut described in the foregoing may further comprise deactivating the user selectable shortcut upon determining occurrence of a subsequent user interaction with a physical control interface of the vehicle affecting a vehicle function other than said predetermined vehicle function. Thereby, the shortcut—which is related to said predetermined function—will no longer be provided and subsequently no longer be selectable. Rather, a subsequent user selectable shortcut adapted to—upon user selection thereof—provide on the display another subset of user selectable setting options enabling adjustment of one or more user adjustable vehicle settings associated with the other vehicle function, may be provided in place thereof. "Deactivating" may refer to "disabling, removing, suppressing and/or making non-selectable", whereas "subsequent" user interaction may refer to "another and/or second" user interaction. Moreover, "a" physical control interface may in this context refer to "another and/or second" physical control interface, whereas the expression "a" vehicle function other than the predetermined vehicle function in this context may refer to "another and/or a second" vehicle function other than the predetermined vehicle function.

Optionally, the method performed by the vehicle settings adjustment system described in the foregoing may further comprise the vehicle settings adjustment system determining occurrence of user selection of the user selectable shortcut on the display, and then providing the subset of user selectable setting options on the display. Thereby, it is established that a user such as a driver or passenger has selected the shortcut via the display, and following therefrom, the subset of setting options enabling adjustment of one or more user adjustable vehicle settings associated with the predetermined vehicle function, is provided on the display. Accordingly, upon selection of the shortcut, there is provided—via the subset shown on the display—the opportunity of adjusting, activating and/or deactivating vehicle settings related to the specific vehicle function which was affected by the previous physical control interface user interaction, e.g. the opportunity of activating/deactivating the exemplifying vehicle setting Active High Beam should said predetermined vehicle function for instance be represented by vehicle lights and more specifically headlights as a result of the driver having activated headlights via e.g. the steering wheel paddle thus representing the physical control interface affecting the vehicle function vehicle lights. In this manner, selection of the shortcut enables direct access to vehicle settings associated with the vehicle function affected by the latest physical control interface user interaction. "Determining" occurrence of user selection may refer to "detecting" and/or "sensing" occurrence of user selection, whereas "user selection of" the user selectable shortcut may refer to "user interaction and/or user engagement with" the user selectable shortcut. Determining occurrence of user selection of the shortcut may be accomplished as commonly known in the art, such as by means of one or more known sensors, supporting sensing of e.g. touch and/or gestures, and/or eye tracking etc.

Optionally, the method performed by the vehicle settings adjustment system described above may further comprise the vehicle settings adjustment system determining occurrence of user adjustment via the display of one or more user selectable setting options of the subset, and adapting one or more of the one or more user adjustable vehicle settings of the predetermined vehicle function according to the user adjustment. Thereby, it is established that a user via the setting options available on the display has adjusted vehicle settings related to the predetermined vehicle function, and following therefrom, the corresponding vehicle settings of said predetermined vehicle function are adapted in accordance therewith. Accordingly, for setting options associated with the predetermined vehicle function such as e.g. vehicle lights and/or headlights, vehicle settings associated therewith such as e.g. activation/deactivation of e.g. Active High Beam and/or Active Bending Lights etc. are adjusted without the user having to scroll through and/or go deep into menus to find said setting options. In this manner, vehicle settings associated with the vehicle function affected by the latest physical control interface user interaction are adjusted in a direct, time efficient and convenient manner. "Determining" occurrence of user adjustment may refer to "sensing and/or detecting" occurrence of user adjustment, whereas determining "occurrence of user adjustment" may refer to determining "that a user has touched, engaged with, and/or interacted with". Determining occurrence of user adjustment of one or more setting options may indicate that it has been established that at least a first setting option has been for instance activated, deactivated, and/or modified by the user via said display. Determining occurrence of user adjustment may be established as known in the art, e.g. by commonly known sensors, such as e.g. one or more touch sensors, gesture sensors and/or eye tracking sensors. The expression "one or more" user selectable setting options may refer to "at least a first" user selectable setting option, whereas "adapting" in this context may refer to "configuring, enabling and/or initiating adaptation of".

Optionally, the method performed by the vehicle settings adjustment system described herein may further comprise the vehicle settings adjustment system categorizing one or more user adjustable vehicle settings to be associated with a predetermined vehicle function, adjustment of the one or more user adjustable vehicle settings of the predetermined vehicle function being enabled by means of a subset of user selectable setting options adapted to be provided on a display of the vehicle. Thereby, one or more user adjustable vehicle settings considered to be related to a specific vehicle function, are prematurely and/or initially mapped to be associated with said specific vehicle function, and adjustment of settings thereof enabled via user selectable setting options related thereto, via a display of the vehicle. A first subset of vehicle settings may be categorized to be associated with a first predetermined vehicle function, whereas a second subset of vehicle settings may be categorized to be associated with a second predetermined vehicle function. "Categorizing" may refer to "mapping", "linking" and/or "filtering out", whereas "to be associated with" a predetermined vehicle function may refer to "relate to, correspond to and/or affect" a predetermined vehicle function.

According to an example, the display may comprise a touch display. The determining of occurrence of user selection described in the foregoing and/or the optional determining of occurrence of user adjustment described above then comprises detecting user touch. Thereby, user interaction with the user selectable shortcut and/or user interaction with one or more of the user selectable setting options of the subset, may be detected and/or sensed in a convenient manner, for instance with support from one or more known touch sensors.

According to a second aspect of embodiment herein, the object is achieved by a vehicle settings adjustment system adapted for facilitating user adjustment of vehicle settings of a vehicle via a display of the vehicle. The vehicle settings adjustment system comprises a user interaction determining unit adapted for determining occurrence of user interaction with a physical control interface of the vehicle, user interaction with the physical control interface affecting a therewith associated predetermined vehicle function. The vehicle settings adjustment system further comprises a shortcut providing unit adapted for providing on the display a user selectable shortcut adapted to, upon user selection thereof, provide on the display a subset of user selectable setting options enabling adjustment of one or more user adjustable vehicle settings associated with the predetermined vehicle function.

Optionally, the shortcut providing unit may further be adapted for providing the user selectable shortcut for a predeterminable and/or predetermined period of time, preferably less than 3 minutes, more preferred less than 1 minute, and most preferred less than 10 seconds.

Optionally, the shortcut providing unit may further be adapted for deactivating the user selectable shortcut upon determining occurrence of a subsequent user interaction with a physical control interface of the vehicle affecting a vehicle function other than the predetermined vehicle function.

Optionally, the vehicle settings adjustment system may further comprise a shortcut selection determining unit adapted for determining occurrence of user selection of the user selectable shortcut on the display, and a setting options providing unit adapted for providing the subset of user selectable setting options on the display.

Optionally, the vehicle settings adjustment system may further comprise a user adjustment determining unit adapted for determining occurrence of user adjustment via the display of one or more user selectable setting options of the subset, and a function adapting unit adapted for adapting one or more of the one or more user adjustable vehicle settings of the predetermined vehicle function according to the user adjustment.

Optionally, the vehicle settings adjustment system may further comprise a categorizing unit adapted for categorizing one or more user adjustable vehicle settings to be associated with a predetermined vehicle function, adjustment of the one or more user adjustable vehicle settings of the predetermined vehicle function being enabled by means of a subset of user selectable setting options adapted to be provided on a display of the vehicle.

Similar advantages as those mentioned in the foregoing in relation to the first aspect correspondingly apply to the second aspect; accordingly these advantages are not further discussed.

According to a third aspect of embodiment herein, the object is achieved by a vehicle comprising a vehicle settings adjustment system as described herein. Yet again, similar advantages as those mentioned in the foregoing in relation to the first aspect correspondingly apply to the third aspect; accordingly these advantages are not further discussed.

According to a fourth aspect of embodiments herein, the object is achieved by a computer program product comprising a computer program containing computer program code means arranged to cause a computer or a processor to execute the steps of the vehicle settings adjustment system discussed above, stored on a computer-readable medium or a carrier wave. Once more, similar advantages as those mentioned in the foregoing in relation to the first aspect correspondingly apply to the fourth aspect; accordingly these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which.

DESCRIPTION OF EMBODIMENTS

Figure 1:
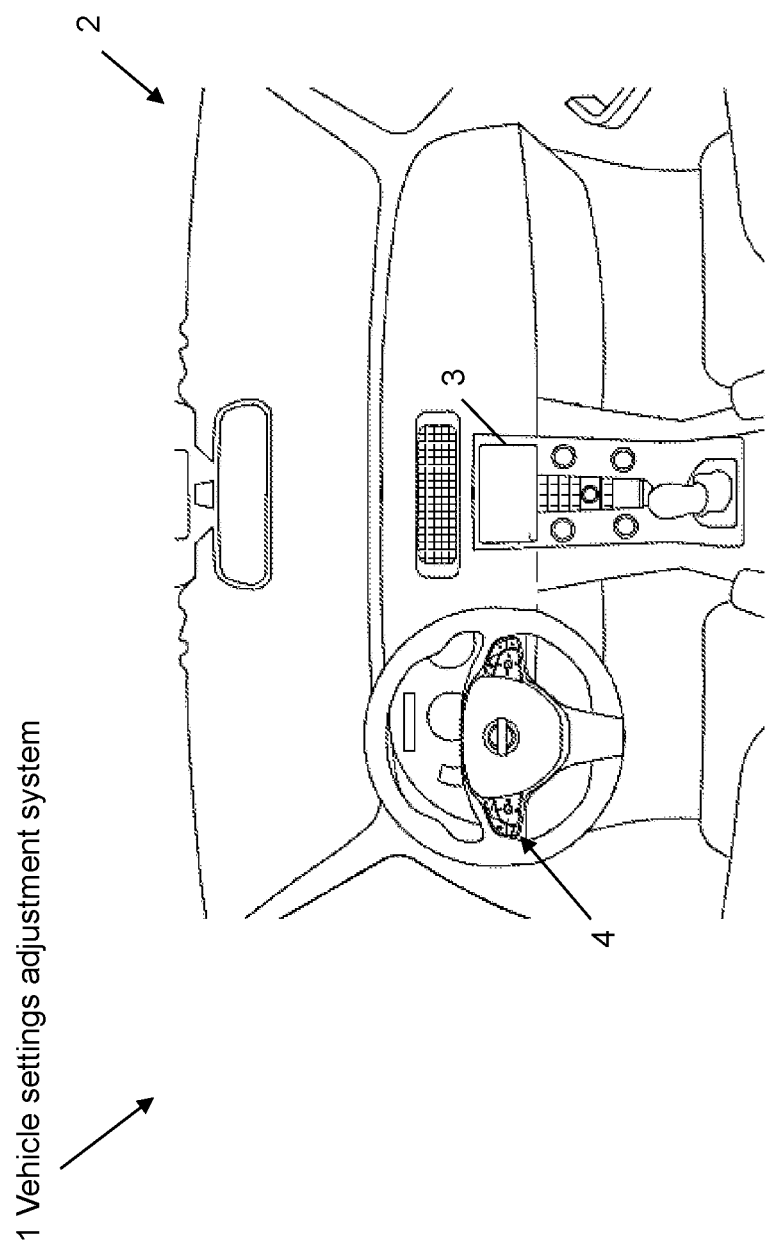
FIG. 1 illustrates a schematic overview of an exemplifying vehicle settings adjustment system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to facilitating user adjustment of vehicle settings of a vehicle via a display of the vehicle, there will be disclosed an approach which enables a user such as a driver or passenger to change certain vehicle settings in a simplified manner.

Referring now to the figures and FIG. 1 in particular, there is illustrated a schematic overview of an exemplifying vehicle settings adjustment system 1 according to embodiments of the disclosure. The vehicle settings adjustment system 1 is adapted for facilitating user adjustment of vehicle settings of a vehicle 2 via a display 3 thereof. The vehicle 2, which comprises the vehicle settings adjustment system 1, is here represented by an exemplifying passenger car, and the display 3 by an exemplifying touch display comprised in a dashboard of the vehicle 2. Further shown is a physical control interface 4 of the vehicle 2, which physical control interface 4 upon user interaction therewith affects a therewith associated predetermined vehicle function. The physical control interface 4 is here represented by an exemplifying steering wheel paddle, knob, switch, button and/or touch-sensing surface or area controlling vehicle lights and more specifically headlights, which here thus represents said predetermined vehicle function.

Figure 2:
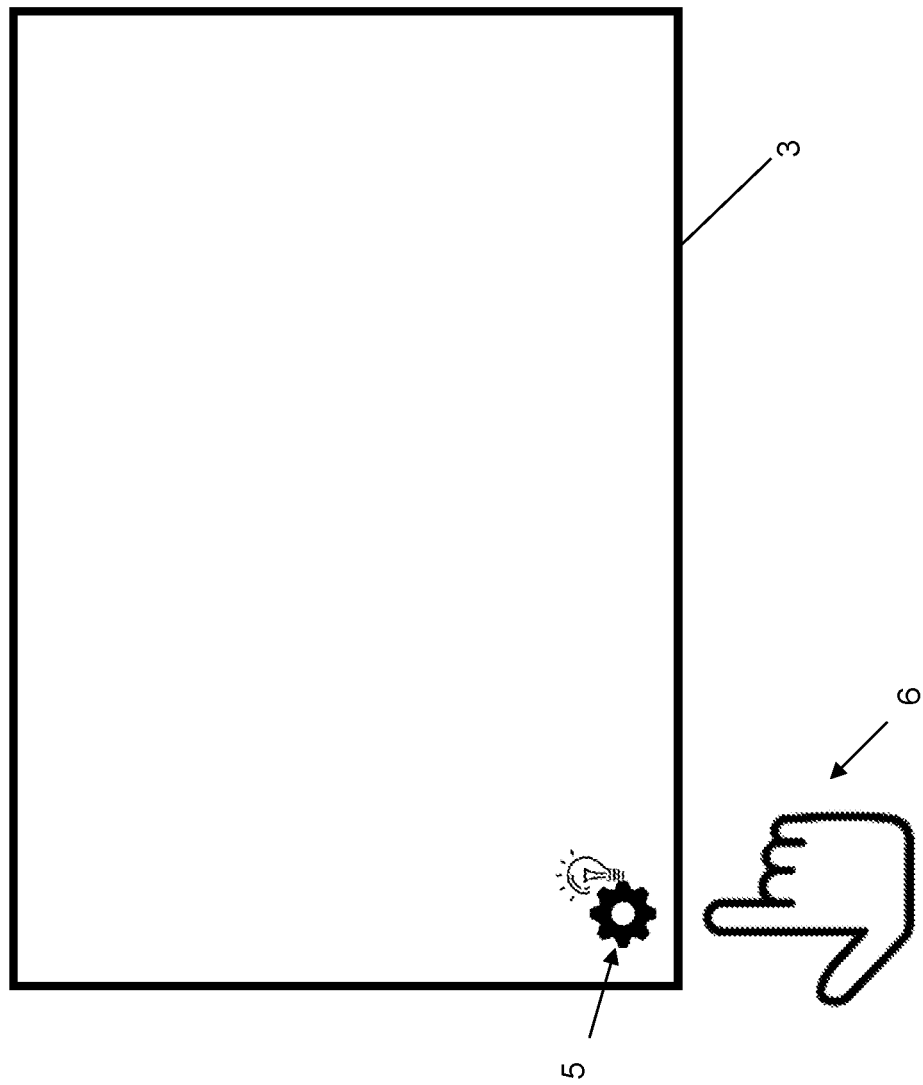
FIG. 2 illustrates a schematic overview of an exemplifying user selectable shortcut according to embodiments of the disclosure.

FIG. 2 illustrates a schematic overview of an exemplifying user selectable shortcut 5 according to embodiments of the disclosure. The user selectable shortcut 5 is here represented by an exemplifying icon illustrated as a combined cogwheel and lightbulb, located in the exemplifying left hand lower corner of the display 3. Further shown in FIG. 2 is an exemplifying hand of a user 6—here a driver of the vehicle 2—depicted as potentially selecting the user selectable shortcut 5, which will be described in greater detail in the following.

Figure 3:
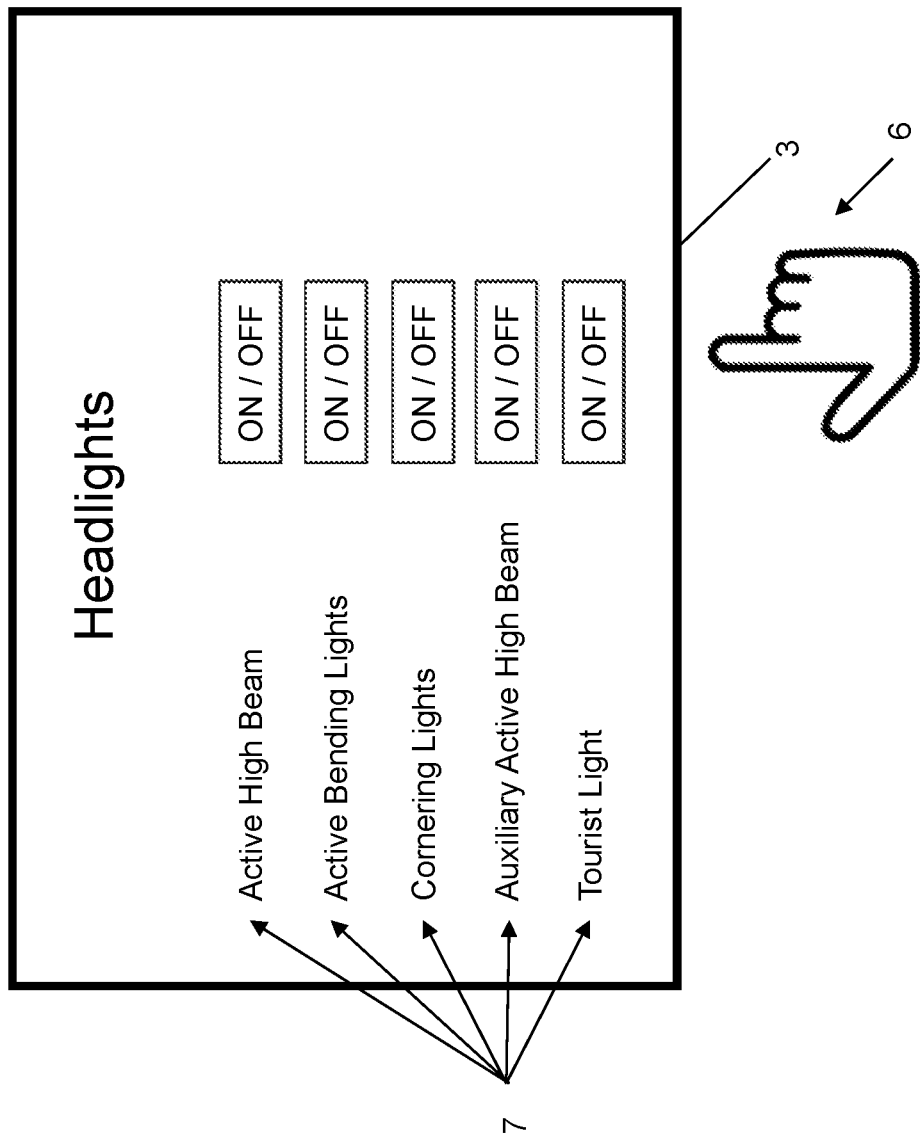
FIG. 3 illustrates a schematic overview of an exemplifying subset of user selectable setting options according to embodiments of the disclosure.

FIG. 3 illustrates a schematic overview of an exemplifying subset of user selectable setting options 7 provided on the display 3 according to embodiments of the disclosure. The subset 7 enables adjustment of one or more user adjustable vehicle settings associated with the predetermined vehicle function, which predetermined vehicle function here is represented by vehicle lights and/or headlights as discussed above in conjunction with FIG. 1. The subset of user selectable setting options 7 is in the shown embodiment represented by exemplifying setting options enabling adjustment of the vehicle settings Active High Beam, Active Bending Lights, Cornering Lights, Auxiliary Active High Beam and Tourist Light. Further shown in FIG. 3 is the exemplifying user 6 depicted as potentially adjusting one or more of the user selectable setting options of the subset 7, which will be described in greater detail in conjunction with FIG. 5.

As further shown in FIG. 4, which depicts a schematic block diagram illustrating an exemplifying vehicle settings adjustment system 1 according to embodiments of the disclosure, the vehicle settings adjustment system 1 comprises a user interaction determining unit 102 and a shortcut providing unit 103 which will be described in greater detail further on in the description. The vehicle settings adjustment system 1 may further comprise an optional categorizing unit 101, an optional shortcut selection determining unit 104, an optional setting options providing unit 105, an optional user adjustment determining unit 106 and/or an optional function adapting unit 107, which similarly will be described in greater detail further on.

Furthermore, the embodiments herein for facilitating user adjustment of vehicle settings of a vehicle 2 via a display 3 of the vehicle 2, may be implemented through one or more processors, such as a processor 108, here denoted CPU, together with computer program code for performing the functions and actions of the embodiments herein. Said program code may also be provided as a computer program product, for instance in the form of a data carrier carrying computer program code for performing the embodiments herein when being loaded into the vehicle settings adjustment system 1. One such carrier may be in the form of a CD ROM disc or DVD. It is however feasible with other data carriers such as a memory stick. The computer program code may furthermore be provided as pure program code on a server and downloaded to the vehicle settings adjustment system 1. The vehicle settings adjustment system 1 may further comprise a memory 109 comprising one or more memory units. The memory 109 may be arranged to be used to store e.g. information, and further to store data, configurations, schedulings, and applications, to perform the methods herein when being executed in the vehicle settings adjustment system 1. Furthermore, the user interaction determining unit 102, the shortcut providing unit 103, the optional categorizing unit 101, the optional shortcut selection determining unit 104, the optional setting options providing unit 105, the optional user adjustment determining unit 106 and/or the optional function adapting unit 107 may for instance at least partly be implemented in in one or more nodes 110 on-board the vehicle 2, such as comprised in e.g. one or more ECUs thereof. Those skilled in the art will also appreciate that the user interaction determining unit 102, the shortcut providing unit 103, the optional categorizing unit 101, the optional shortcut selection determining unit 104, the optional setting options providing unit 105, the optional user adjustment determining unit 106 and/or the optional function adapting unit 107, which will be described in further detail later on in this description, may refer to a combination of analog and digital circuits, and/or one or more processors configured with software and/or firmware, e.g. stored in a memory such as the memory 109, that when executed by the one or more processors such as the processor 108 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
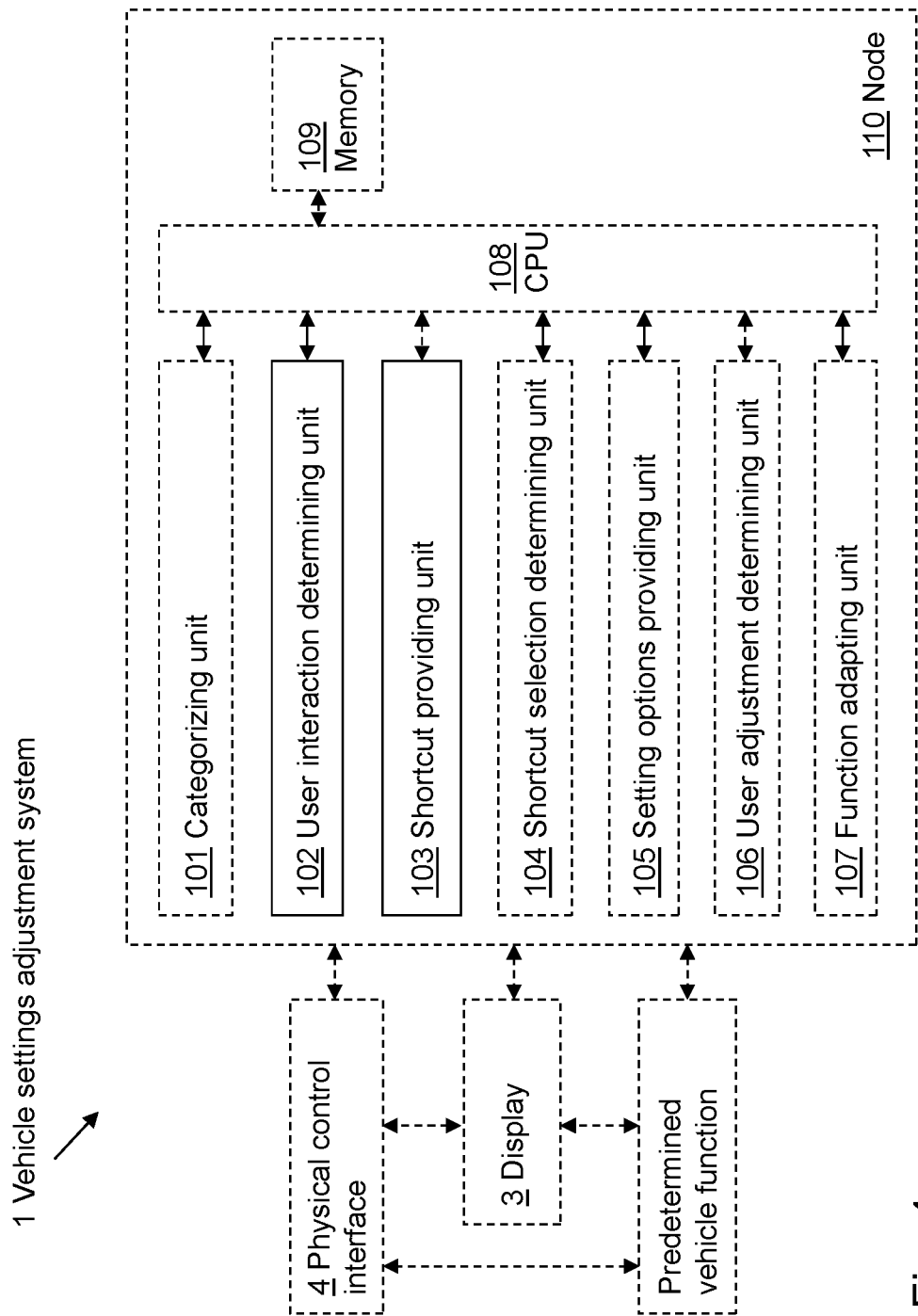
FIG. 4 is a schematic block diagram illustrating an exemplifying vehicle settings adjustment system according to embodiments of the disclosure.
Figure 5:
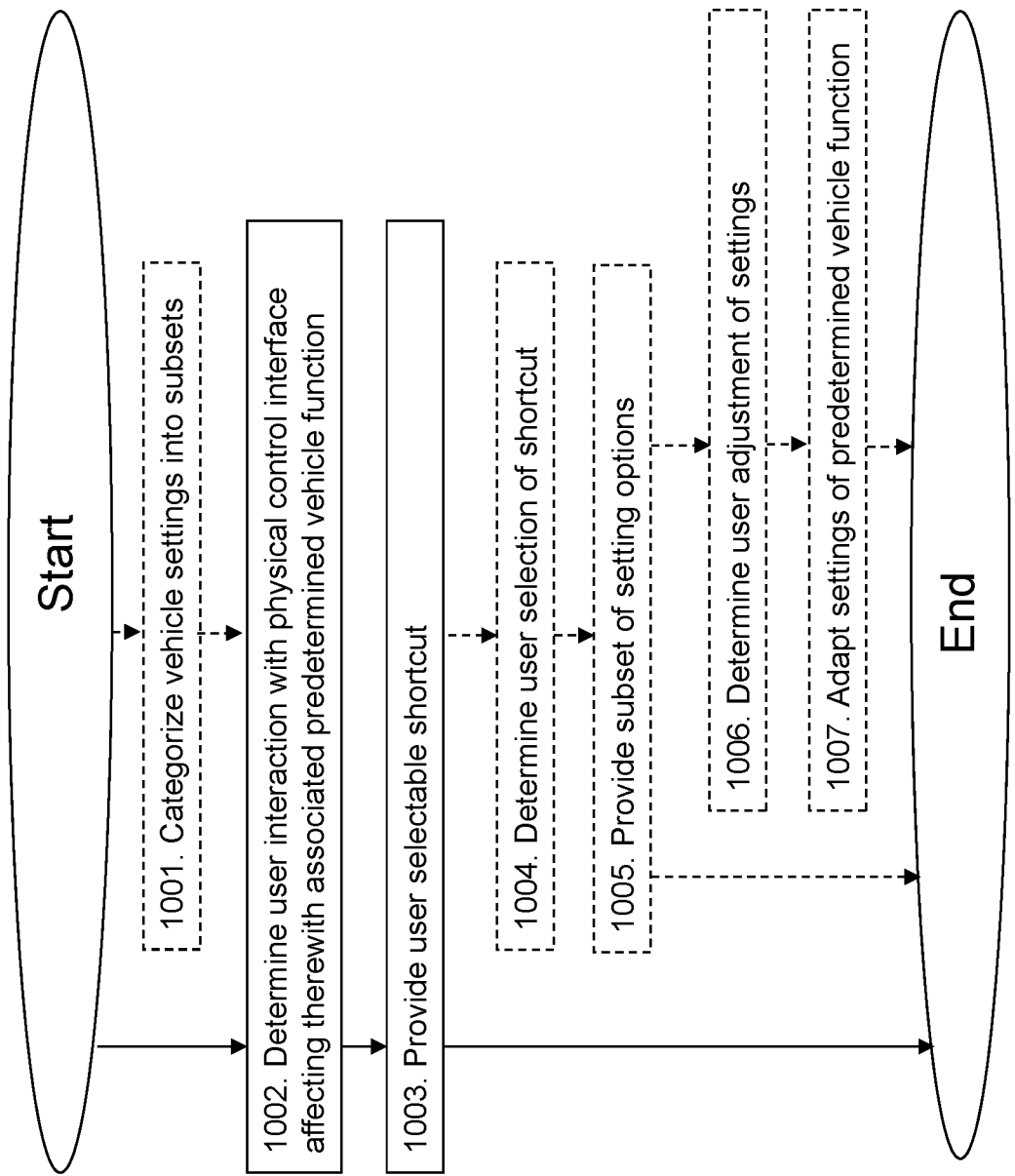
FIG. 5 is a flowchart depicting an exemplifying method for facilitating user adjustment of vehicle settings according to embodiments of the disclosure.

FIG. 5 is a flowchart depicting an exemplifying method for facilitating user adjustment of vehicle settings according to embodiments of the disclosure. The method is performed by the vehicle settings adjustment system 1. The exemplifying method, which may be continuously repeated, comprises the following actions discussed with support from FIGS. 1-4.

Action 1001: In optional Action 1001, the vehicle settings adjustment system 1 may categorize—e.g. by means of the categorizing unit 101—one or more user adjustable vehicle settings to be associated with a predetermined vehicle function, adjustment of the one or more user adjustable vehicle settings of the predetermined vehicle function being enabled by means of a subset of user selectable setting options 7 adapted to be provided on the display 3 of the vehicle 2.

Thus, as shown with support at least from FIGS. 3 and 4, one or more user adjustable vehicle settings—here Active High Beam, Active Bending Lights, Cornering Lights, Auxiliary Active High Beam and Tourist Light—considered to be related to the specific vehicle function—here the headlights—are prematurely and/or initially mapped to be associated with said specific vehicle function thus headlights, and adjustment of said settings are enabled via user selectable setting options related thereto, via the vehicle display 3.

Action 1002: In Action 1002, the vehicle settings adjustment system 1 determines—e.g. by means of the user interaction determining unit 102—occurrence of user interaction with a physical control interface 4 of the vehicle 2, user interaction with the physical control interface 4 affecting a therewith associated predetermined vehicle function.

Thus, as shown with support at least from FIGS. 1 and 4, it is established that the user 6—here the vehicle driver—has engaged with a physical user interface 4 of the vehicle 2, here with the steering wheel paddle, knob, switch, button or touch-sensing surface or area, which interaction has impact on a vehicle function associated therewith—here the headlights.

Action 1003: In Action 1003, the vehicle settings adjustment system 1 provides on the display 3—e.g. by means of the shortcut providing unit 103—a user selectable shortcut 5 adapted to, upon user selection thereof, provide on the display 3 a subset of user selectable setting options 7 enabling adjustment of one or more user adjustable vehicle settings associated with the predetermined vehicle function.

Thus, as shown with support from FIGS. 1-4, a shortcut 5—here represented by an icon—is provided on the display 3 which upon selection provides and thus enables direct access to a vehicle settings menu comprising user adjustable setting options 7 specifically associated with the specific vehicle function—here headlights—affected by the previous physical control interface user interaction—here interaction with the steering wheel control interface 4 affecting headlights. Thereby, a shortcut 5 is provided which upon selection presents a subset of vehicle setting options 7 related to said predetermined vehicle function, whereas other user adjustable setting options unrelated to said predetermined vehicle function may be filtered out. Accordingly, for setting options 7 associated with the predetermined vehicle function, here headlights; rather than having to scroll through and/or go deep into menus to find said setting options 7—here for activation/deactivation of Active High Beam, Active Bending Lights, Cornering Lights, Auxiliary Active High Beam and/or Tourist Light—a direct link to said setting options 7 is provided via the shortcut 5. In this manner, the shortcut 5 enables direct access to vehicle settings 7 associated with the vehicle function affected by the latest physical control interface user interaction—here interaction with the steering wheel control interface 4 affecting headlights.

Optionally, Action 1003 of providing a user selectable shortcut 5, may comprise—and/or said shortcut providing unit 103 may further be adapted for—providing the user selectable shortcut 5 for a predeterminable and/or predetermined period of time, preferably less than 3 minutes, more preferred less than 1 minute, and most preferred less than 10 seconds. Thus, as shown with support from at least FIGS. 2 and 4, the shortcut 5 is displayed and thus available temporarily, rather than permanently. Accordingly, following upon a physical control interface interaction affecting a specific vehicle function—here the headlights—the shortcut 5 gives direct access 7 to adjusting user adjustable vehicle settings related to said vehicle function, for a period of time considered relevant; after that the shortcut 5 is disabled, removed and/or inactivated.

Additionally or alternatively, Action 1003 of providing a user selectable shortcut 5, may comprise—and/or said shortcut providing unit 103 may further be adapted for—deactivating the user selectable shortcut 5 upon determining occurrence of a subsequent user interaction with a physical control interface of the vehicle 2 affecting a vehicle function other than the predetermined vehicle function. Thus, as shown with support from at least FIGS. 2 and 4, the shortcut 5—which is related to said predetermined function i.e. headlights—will upon a subsequent physical user interface interaction affecting another vehicle function, no longer be provided and subsequently no longer be selectable. Rather, a subsequent user selectable shortcut adapted to—upon user selection thereof—provide on the display 3 another subset of user selectable setting options enabling adjustment of one or more user adjustable vehicle settings associated with the other vehicle function, may be provided in place thereof.

Action 1004: In optional Action 1004, the vehicle settings adjustment system 1 may determine—e.g. by means of the shortcut selection determining unit 104—occurrence of user selection of the user selectable shortcut 5 on the display 3.

Thus, as shown with support from at least FIGS. 2 and 4, it is established that the user 6 has selected the shortcut 5 via the display 3.

Action 1005: In optional Action 1005, the vehicle settings adjustment system 1 may provide—e.g. by means of the setting options providing unit 105—the subset of user selectable setting options 7 on the display 3.

Thus, as shown with support at least from FIGS. 3 and 4, the subset of setting options 7 enabling adjustment of one or more user adjustable vehicle settings associated with the predetermined vehicle function, is provided on the display 3. Accordingly, upon selection of the shortcut 5, there is provided via the subset 7 shown on the display 3 the opportunity of adjusting, activating and/or deactivating vehicle settings—here the Active High Beam, Active Bending Lights, Cornering Lights, Auxiliary Active High Beam and/or Tourist Light—related to the specific vehicle function—here headlights—which was affected by the previous physical control interface user interaction—here interaction with the steering wheel control interface 4 affecting headlights. In this manner, selection of the shortcut 5 enables direct access to vehicle settings associated with the vehicle function affected by the latest physical control interface user interaction.

Action 1006: In optional Action 1006, the vehicle settings adjustment system 1 may determine—e.g. by means of the user adjustment determining unit 106—occurrence of user adjustment via the display 3 of one or more user selectable setting options of the subset 7.

Thus, as shown with support from at least FIGS. 3 and 4, it is established that the user 6 via the setting options 7 available on the display 3 has adjusted vehicle settings, here Active High Beam, Active Bending Lights, Cornering Lights, Auxiliary Active High Beam and/or Tourist Light, related to the predetermined vehicle function—here the headlights.

Action 1007: In optional Action 1007, the vehicle settings adjustment system 1 may adapt—e.g. by means of the function adapting unit 107—one or more of the one or more user adjustable vehicle settings of the predetermined vehicle function according to the user adjustment.

Thus, as shown with support at least from FIG. 4, the corresponding vehicle settings of the predetermined vehicle function are adapted in accordance therewith. Accordingly, for setting options 7 associated with the predetermined vehicle function—here headlights—vehicle settings associated therewith, here Active High Beam, Active Bending Lights, Cornering Lights, Auxiliary Active High Beam and/or Tourist Light, are adjusted without the user 6 having to scroll through and/or go deep into menus to find said setting options 7. In this manner, vehicle settings associated with the vehicle function affected by the latest physical control interface user interaction—here interaction with the steering wheel control interface 4 affecting headlights—are adjusted in a direct, time efficient and convenient manner.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a vehicle settings adjustment system for facilitating user adjustment of vehicle settings of a vehicle via a display of said vehicle, said method comprising:
   determining occurrence of user interaction with a physical control interface of said vehicle, user interaction with said physical control interface affecting a therewith associated predetermined vehicle function; and
   responsive to said determined occurrence of said user interaction with said physical control interface, providing on said display a user selectable shortcut adapted to, upon user selection thereof, provide on said display a subset of user selectable setting options enabling adjustment of one or more user adjustable vehicle settings associated with said associated predetermined vehicle function;
   wherein said providing a user selectable shortcut comprises providing said user selectable shortcut for a predeterminable period of time of less than 3 minutes.

2. The method according to claim 1, wherein said providing a user selectable shortcut comprises deactivating said user selectable shortcut upon determining occurrence of a subsequent user interaction with a physical control interface of said vehicle affecting a vehicle function other than said predetermined vehicle function.

3. The method according to claim 1, further comprising:
   determining occurrence of user selection of said user selectable shortcut on said display; and
   providing said subset of user selectable setting options on said display.

4. The method according to claim 3, further comprising:
   determining occurrence of user adjustment via said display of one or more user selectable setting options of said subset; and
   adapting one or more of said one or more user adjustable vehicle settings of said predetermined vehicle function according to said user adjustment.

5. The method according to claim 1, further comprising:
   categorizing one or more user adjustable vehicle settings to be associated with a predetermined vehicle function, adjustment of the one or more user adjustable vehicle settings of said predetermined vehicle function being enabled by means of a subset of user selectable setting options adapted to be provided on a display of said vehicle.

6. A vehicle settings adjustment system adapted for facilitating user adjustment of vehicle settings of a vehicle via a display of said vehicle, said vehicle settings adjustment system comprising:
   a user interaction determining unit adapted for determining occurrence of user interaction with a physical control interface of said vehicle, user interaction with said physical control interface affecting a therewith associated predetermined vehicle function; and
   a shortcut providing unit adapted for, responsive to said determined occurrence of said user interaction with said physical control interface, providing on said display a user selectable shortcut adapted to, upon user selection thereof, provide on said display a subset of user selectable setting options enabling adjustment of one or more user adjustable vehicle settings associated with said associated predetermined vehicle function;
   wherein said shortcut providing unit further is adapted for providing said user selectable shortcut for a predeterminable period of time of less than 3 minutes.

7. The vehicle settings adjustment system according to claim 6, wherein said shortcut providing unit further is adapted for deactivating said user selectable shortcut upon determining occurrence of a subsequent user interaction with a physical control interface of said vehicle affecting a vehicle function other than said predetermined vehicle function.

8. The vehicle settings adjustment system according to claim 6, further comprising:
   a shortcut selection determining unit adapted for determining occurrence of user selection of said user selectable shortcut on said display; and
   a setting options providing unit adapted for providing said subset of user selectable setting options on said display.

9. The vehicle settings adjustment system according to claim 8, further comprising:
   a user adjustment determining unit adapted for determining occurrence of user adjustment via said display of one or more user selectable setting options of said subset; and
   a function adapting unit adapted for adapting one or more of said one or more user adjustable vehicle settings of said predetermined vehicle function according to said user adjustment.

10. The vehicle settings adjustment system according to claim 6, further comprising:
    a categorizing unit adapted for categorizing one or more user adjustable vehicle settings to be associated with a predetermined vehicle function, adjustment of the one or more user adjustable vehicle settings of said predetermined vehicle function being enabled by means of a subset of user selectable setting options adapted to be provided on a display of said vehicle.

11. A vehicle comprising a vehicle settings adjustment system according to claim 6.

12. A computer program product comprising a computer program containing computer program code means arranged to cause a computer or a processor to execute the steps of a method according to claim 1, stored on a computer-readable medium or a carrier wave.

\* \* \* \* \*